(12) United States Patent
Yun et al.

(10) Patent No.: US 11,472,922 B2
(45) Date of Patent: Oct. 18, 2022

(54) POLYIMIDE FILM, FLEXIBLE SUBSTRATE USING SAME, AND FLEXIBLE DISPLAY COMPRISING FLEXIBLE SUBSTRATE

(71) Applicant: LG CHEM, LTD., Seoul (KR)

(72) Inventors: Cheolmin Yun, Daejeon (KR); Bora Shin, Daejeon (KR); Danbi Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 36 days.

(21) Appl. No.: 17/058,910

(22) PCT Filed: Oct. 15, 2019

(86) PCT No.: PCT/KR2019/013476
§ 371 (c)(1),
(2) Date: Nov. 25, 2020

(87) PCT Pub. No.: WO2020/159035
PCT Pub. Date: Aug. 6, 2020

(65) Prior Publication Data
US 2021/0198426 A1 Jul. 1, 2021

(30) Foreign Application Priority Data

Feb. 1, 2019 (KR) .................. 10-2019-0013488
Feb. 1, 2019 (KR) .................. 10-2019-0013489
Oct. 7, 2019 (KR) .................. 10-2019-0124104

(51) Int. Cl.
*B32B 7/02* (2019.01)
*C08G 73/10* (2006.01)
*C08J 5/18* (2006.01)

(52) U.S. Cl.
CPC ..... *C08G 73/1042* (2013.01); *C08G 73/1039* (2013.01); *C08J 5/18* (2013.01); *C08J 2379/08* (2013.01)

(58) Field of Classification Search
CPC ............. C08G 73/1039; C08G 73/1042; C08J 2379/08; C08J 5/18; C08L 2203/16; C09D 179/08
See application file for complete search history.

(56) References Cited

U.S. PATENT DOCUMENTS 5,124,199 A * 6/1992 O'Quinn ................. B32B 27/08
156/289
9,012,595 B2 4/2015 Kim et al.
(Continued)

FOREIGN PATENT DOCUMENTS

EP 3 150 655 A1 4/2017
EP 3392293 A1 10/2018
(Continued)

OTHER PUBLICATIONS

European Search Report issued for European Patent Application No. 19913962.7 dated May 6, 2021, 7 pages.
(Continued)

*Primary Examiner* — Lawrence D Ferguson
(74) *Attorney, Agent, or Firm* — Rothwell, Figg, Ernst & Manbeck, P.C.

(57) ABSTRACT

According to the present invention, damage such as film tearing during a rolling process can be reduced by using, as a substrate for a flexible display, a polyimide film having the thickness of 5-10 μm, modulus of 3-8 GPa, the absolute value of out-of-plane retardation (Rth) of 200-600 nm, and a strain, at a tensile force of 100 MPa, of 10% or less. In addition, since the polyimide film has low residual stress with respect to inorganic substrates, the occurrence of defects during a TFT process is reduced. As a result, processing reliability for a flexible display can be improved. In addition, the saturated static electricity half-life of the polyimide film is controlled to be 250 seconds or more so as to minimize the voltage loss ratio of saturated static elec-
(Continued)

tricity and reduce the current drop during a TFT operation, and, as a result, enables a display having improved luminosity to be provided.

19 Claims, 1 Drawing Sheet

(56) References Cited

U.S. PATENT DOCUMENTS

| | | | |
|---|---|---|---|
| 9,921,429 B2 | 3/2018 | Oka et al. | |
| 2006/0082708 A1 | 4/2006 | Nagase et al. | |
| 2012/0306777 A1 | 12/2012 | Kang et al. | |
| 2013/0211040 A1 | 8/2013 | Nakao et al. | |
| 2017/0165879 A1 | 6/2017 | Miyamoto et al. | |
| 2019/0048141 A1 | 2/2019 | Yun et al. | |
| 2021/0179780 A1 | 6/2021 | Yun et al. | |

FOREIGN PATENT DOCUMENTS

| | | |
|---|---|---|
| EP | 3 536 732 A1 | 9/2019 |
| JP | 2017-016005 A | 1/2017 |
| JP | 2017-064709 A | 4/2017 |
| JP | 2018-145440 A | 9/2018 |
| KR | 10-0752093 B1 | 8/2007 |
| KR | 10-2011-0007588 A | 1/2011 |
| KR | 10-2012-0133848 A | 12/2012 |
| KR | 10-2015-0095980 A | 8/2015 |
| KR | 10-2015-0113927 A | 10/2015 |
| KR | 10-2017-0038718 A | 4/2017 |
| KR | 10-2017-0073977 A | 6/2017 |
| KR | 10-2017-0076096 A | 7/2017 |
| KR | 10-1796875 B1 | 11/2017 |
| KR | 10-2018-0012196 A | 2/2018 |
| KR | 10-2018-0047285 A | 5/2018 |
| WO | 2018-021747 A1 | 2/2018 |
| WO | 2019-188305 A1 | 10/2019 |

OTHER PUBLICATIONS

Office Action issued for Japanese Patent Application No. 2020-560459 dated Dec. 14, 2021, 12 pages.
International Search Report issued for International Application No. PCT/KR2019/013476 dated Jan. 29, 2020, 6 pages.
Chiu e al., Roll TFT-LCD with 20R Curvature using Optically Compensated Colorless-Polyimide Substrate, SID Symposium Digest of Technical Papers, 2016, pp. 15-17.
Tanaka Naoki, Flexible LCD Displays Exhibited at SID 2016 (1), NIKKEI XTECH, Jun. 1, 2016, pp. 1-2.

* cited by examiner

POLYIMIDE FILM, FLEXIBLE SUBSTRATE USING SAME, AND FLEXIBLE DISPLAY COMPRISING FLEXIBLE SUBSTRATE

This application is a 35 U.S.C. 371 National Phase Entry Application from PCT/KR2019/013476 filed on Oct. 15, 2019, designating the United States, which claims the benefits of priorities to Korean Patent Application Nos. 10-2019-0013488 and 10-2019-0013489, filed on Feb. 1, 2019 and 10-2019-0124104, filed on Oct. 7, 2019, the entire disclosures of which are incorporated herein by reference.

BACKGROUND OF THE INVENTION

1. Field of the Invention

The present invention relates to a polyimide film for a flexible substrate having improved physical properties, and a flexible display manufactured by using the same.

2. Background of the Invention

In recent years, weight reduction and miniaturization of products have been emphasized in the field of display. A currently used glass substrate is heavy and brittle and is difficult to apply to a continuous process. Accordingly, researches are actively carried out for applying a plastic substrate having advantages of lightness, flexibility, and applicability to continuous process and substitutable for a glass substrate, to a cell phone, a notebook and a PDA.

In particular, a polyimide (PI) resin has an advantage that it is easy to be synthesized, can be formed into a thin film and does not require a crosslinking group for curing. Recently, due to weight reduction and precision of electronic products, a polyimide is widely used as a material for integration in semiconductor such as LCD, PDP, etc. In particular, many studies have progressed for PI to apply to a flexible plastic display board having light and flexible characteristics.

A polyimide (PI) film, which is produced by film-forming the polyimide resin, is generally prepared by solution polymerization of aromatic dianhydride and aromatic diamine or aromatic diisocyanate to prepare a solution of polyamic acid derivative, coating the solution on a silicon wafer or a glass, and curing by heat treatment.

A flexible device involving a high temperature process requires heat resistance at high temperatures. In particular, an organic light emitting diode (OLED) device manufactured using a low temperature polysilicon (LTPS) process may have a process temperature close to 500° C. However, at this temperature, thermal decomposition by hydrolysis tends to occur even with the polyimide having excellent heat resistance. Therefore, in order to manufacture a flexible device using a polyimide film, there is required development of a polyimide film which enables to exhibit excellent heat resistance and storage stability so that thermal decomposition by hydrolysis during the high temperature process does not occur.

BRIEF SUMMARY OF THE INVENTION

A problem to be solved by the present invention is to provide a polyimide film having improved mechanical and optical properties.

Other problem to be solved by the present invention is to provide a laminate comprising the polyimide film as a flexible substrate.

Another problem to be solved by the present invention is to provide a flexible display comprising the polyimide film as a display substrate.

According to one aspect of the present invention, there is provided a polyimide film comprising:

a polymerized and cured product of an acid dianhydride and a diamine, wherein at least one of the acid dianhydride and the diamine has a fluorine-containing substituent, wherein the film has a thickness of 5 to 10 μm, a modulus of 3 to 8 GPa, an absolute value of a retardation in a thickness direction ($R_{th}$) of 200 to 600 nm, and a strain of 10% or less at a tensile force of 100 MPa.

According to other aspect of the present invention, there is a polyimide film having a saturation electrostatic voltage of 1.23 kV or more and a half-life of the electrostatic voltage of 250 seconds or more, wherein the saturation electrostatic voltage and the half-life are measured by a method comprising:

a) applying to a surface of the polyimide film a predetermined direct current voltage by corona discharge to accumulate static charges and detecting a voltage value due to the static charge;

b) measuring a voltage value when the detected voltage value reaches a saturation value and has no more change to obtain the saturation electrostatic voltage, and then stopping application of the corona discharge; and c) continuously detecting the potential value of the film when the application of corona discharge is stopped and measuring the time taken for the detected potential value for the saturation electrostatic voltage to become 50%, obtaining the half-life.

According to one embodiment, the concentration of the fluorine atom contained in the polyimide may be 18 to 28 wt % as calculated according to the following Equation 1.

Concentration of fluorine atom (wt %)={Σ[(19×Mole number of fluorine atoms contained in acid dianhydride or diamine)/Molecular weight of acid dianhydride or diamine]×[(Mass of acid dianhydride or diamine)/(Total mass of acid anhydride and diamine)]}×100 [Equation 1]

According to one embodiment, the diamine may have a fluoro substituent.

According to an embodiment, the acid dianhydride may comprise an acid dianhydride having a fluoro substituent and an acid dianhydride having no fluoro substituent.

According to an embodiment, the molar ratio of the acid dianhydride having a fluoro substituent to the acid dianhydride having no fluoro substituent may be 1:1 to 1:4.

According to one embodiment, the polyimide film may comprise a polymerized and cured product of acid dianhydrides of the following formulas 1a and 1b and a diamine of the following formula 1c.

[Formula 1a]

[Formula 1b]

[Formula 1c]

In the formulas 1b and 1c, $R_1$, $R_2$, $R_3$ and $R_4$ are each independently selected from the group consisting of a hydrogen atom, a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, $Q_1$ and $Q_2$ are each independently selected from a single bond, —O—, —CR'R''—, —C(=O)—, —C(=O)O—, —C(=O)NH—, —S—, —SO—, —SO$_2$—, —O[CH$_2$CH$_2$O]y-(y is an integer of 1 to 44), —NH(C=O)NH—, —NH(C=O)O—, a monocyclic or polycyclic cycloalkylene group having 6 to 18 carbon atoms, a monocyclic or polycyclic arylene group having 6 to 18 carbon atoms and a combination thereof, wherein R' and R'' are each independently selected from the group consisting of a hydrogen atom, an alkyl group having 1 to 10 carbon atoms and a haloalkyl group having 1 to 10 carbon atoms, n1 and n2 are each independently an integer from 1 to 3, and n3 and n4 are each independently an integer from 1 to 4, and at least one of $R_1$, $R_2$, $R_3$, $R_4$, $Q_1$ and $Q_2$ necessarily contains a substituent containing a fluorine atom.

According to an embodiment, in the formula 1c, $Q_2$ is a single bond, and $R_3$ and $R_4$ may each independently be selected from —F, a fluoroalkyl group having 1 to 10 carbon atoms, and a fluoroalkoxy group having 1 to 4 carbon atoms.

According to an embodiment, in the formula 1 b, $Q_1$ is —CR'R''—, and R' and R'' may each independently be a hydrogen atom, an alkyl group having 1 to 10 carbon atoms, and a haloalkyl group having 1 to 10 carbon atoms.

According to one embodiment, the acid dianhydride of the formula 1a may be present in 40 to 80 mol % of the total molar amount of the acid dianhydride.

In addition, the acid dianhydride of the formula 1a may be present in 50 to 79 mol % of the total molar amount of the acid dianhydride.

According to one embodiment, the polyimide film may comprise a polyimide having a repeating structure of the following formula 1.

In the formula 1,

$X_1$ and $X_2$, which may be the same or different, are each independently a tetravalent organic group derived from an acid dianhydride selected from the following structural formulas 1 to 3, (1)

(2)

(3)

$Y_1$, $Y_2$ and $Y_3$, which may be the same or different, are each independently a divalent organic group derived from a diamine selected from the following structural formulas 4 to 6, (4)

[Formula 1]

(5)

(6)

in the structural formulas 4 to 6, $R_3$ and $R_4$ are each independently selected from a hydrogen atom, a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, n3 and n4 are each independently an integer from 1 to 4, n5 and n6 are each independently an integer from 1 to 3, and p, q and r are molar fractions.

According to one embodiment, p+q+r=1, p may be 0.4 to 0.8, and q+r may be 0.2 to 0.6.

According to one embodiment, the polyimide film may have a residual stress after curing on an inorganic substrate of 10 to 25 MPa.

According to one embodiment, the polyimide film may have a bowing value after curing on an inorganic substrate of 5 μm or more and 20 μm or less.

In order to solve another problem of the present invention, there is provided a laminate comprising the polyimide film as a flexible substrate.

According to an embodiment, the laminate may include a +C-plate type compensation film, and the retardation in a thickness direction ($R_{th}$) of the +C-plate type compensation film may be 200 nm or more and 600 nm or less.

In order to solve another problem of the present invention, there is provided a flexible display comprising the polyimide film as a display substrate.

In addition, there is provided a flexible display comprising the laminate.

Effect of the Invention

In the present invention, by using the polyimide film having a thickness of 5 to 10 μm, a modulus of 3 to 8 GPa, an absolute value of a retardation in a thickness direction ($R_{th}$) of 200 to 600 nm, and a strain of 10% or less at a tensile force of 100 MPa as a substrate of the flexible display, it is possible to reduce problems such as tearing of the film in a rolling process, thereby improving process reliability of the flexible display and providing a display with improved visual sensibility. In addition, in the present invention, it is possible to reduce a current drop phenomenon during TFT driving by minimizing a voltage loss for the saturation electrostatic voltage of the polyimide film, reduce occurrence of defects in the TFT process due to low residual stress, and improve reliability of the display device.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

In the present specification, all compounds or organic groups may be substituted or un-substituted, unless otherwise specified. Herein, the term "substituted" means that at least one hydrogen contained in the compound or the organic group is substituted with a substituent selected from the group consisting of a halogen atom, an alkyl group or a halogenated alkyl group having 1 to 10 carbon atoms, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

The flexible display may have poor display performance depending on the bending radius, despite the need to maintain the display performance even when bending occurs. In the flexible display, a plurality of thin film layers and electrical elements are formed on a flexible substrate. When bending of the flexible display occurs largely, stress caused by bending is transmitted to the thin film layer and electrical elements to generate cracks in the thin film layer or to cause the deteriorated characteristics of electrical elements. The flexible display is subjected to a rolling process during the process as necessary. As the bending radius of the film increases by the rolling process, cracks formed in the thin film layer included in the display device may increase.

This is because the leakage current value of the electrical element can be greatly increased at a specific strain value during changing the strain of the flexible substrate by tension force in the substrate by bending of the substrate. As such, when the leakage current value increases, the performance of the device may be deteriorated and flicker or afterimage may occur in the image.

Therefore, if bending in the flexible display device is continued, stress due to bending may be accumulated, causing cracks in the thin film layer or peeling of the thin film layer. As the size of the flexible display is increased, these problems become severe, causing a problem of deteriorating life and reliability of the flexible display device.

According to one aspect of the present invention, there is provided a polyimide film comprising a polymerized and cured product of an acid dianhydride and a diamine, wherein at least one of the acid dianhydride and the diamine has a fluorine-containing substituent, and wherein the film has a thickness of 5 to 10 μm, a modulus of 3 to 8 GPa, an absolute value of a retardation in a thickness direction ($R_{th}$) of 200 to 600 nm, and a strain of 10% or less at a tensile force of 100 MPa.

In the flexible display manufacturing process, a rolling process may be performed after production of a laminate having a TFT layer formed on a polymer film for a substrate. In this case, if physical properties such as flexibility of the film deteriorate, damage such as tearing of the film may occur. For example, when the thickness of the film is 5 to 10 μm and the modulus is less than 3 GPa, tearing of the film may occur during the rolling process.

According to a preferred embodiment, when the thickness of the film may be 5 to 10 μm, 6 to 9 μm or 6 to 8 μm, the modulus may be 3 to 8 GPa, 4 to 7 GPa, or 5 to 7 GPa.

In addition, when the modulus is too large, the retardation in a thickness direction of the film may increase. For example, in the case that the modulus of the film exceeds 8 GPa in the above thickness range, if the absolute value of the retardation in a thickness direction ($R_{th}$) exceeds 600 nm, the visual sensibility of reflection by external light may deteriorate.

According to a preferred embodiment, the absolute value of the retardation in a thickness direction ($R_{th}$) may be 200 to 600 nm, 300 to 600 nm, or 350 to 550 nm. In a flexible substrate, when bending occurs in a process such as a rolling process, stress due to bending may be accumulated in the device layer, and thus display performance may be poor. In this regard, when the strain due to tensile stress of the flexible substrate itself is low, damage to the device may be minimal even if tensile stress and compressive stress are generated in the device layer. Herein, the strain means a ratio of the change in length or volume to the original length or volume due to tension and compression.

The polyimide film according to the present invention has a very small strain of 10% or less when the tensile stress generated by bending is 100 MPa, preferably 1% or more and 10% or less, or 8% or less, 5% or less, or 3% or less. That is, since the yield strength of the film is 100 MPa or more, strain due to stress and tension during the rolling process is low and the stress accumulated to the device layer when used as a flexible substrate is reduced, thereby improving life and reliability of the flexible display.

According to the present invention, by using the film having a thickness of 5 to 10 μm, a modulus of 3 to 8 GPa, a strain of 10% or less at a tensile force of 100 MPa, and an absolute value of a retardation in a thickness direction ($R_{th}$) of 200 to 600 nm, it is possible to provide a flexible panel that does not exhibit cracks or tearing during the rolling process while exhibiting high transparency and low retardation and having a low strain of film even at a high modulus, thereby improving the process reliability of the flexible display.

According to another aspect of the present invention, there is provided a polyimide film having a saturation electrostatic voltage of 1.23 kV or higher and a half-life of the electrostatic voltage of 250 seconds or higher.

When the half-life time is short, current drop may occur during TFT driving, which is not preferable.

Figure 1:
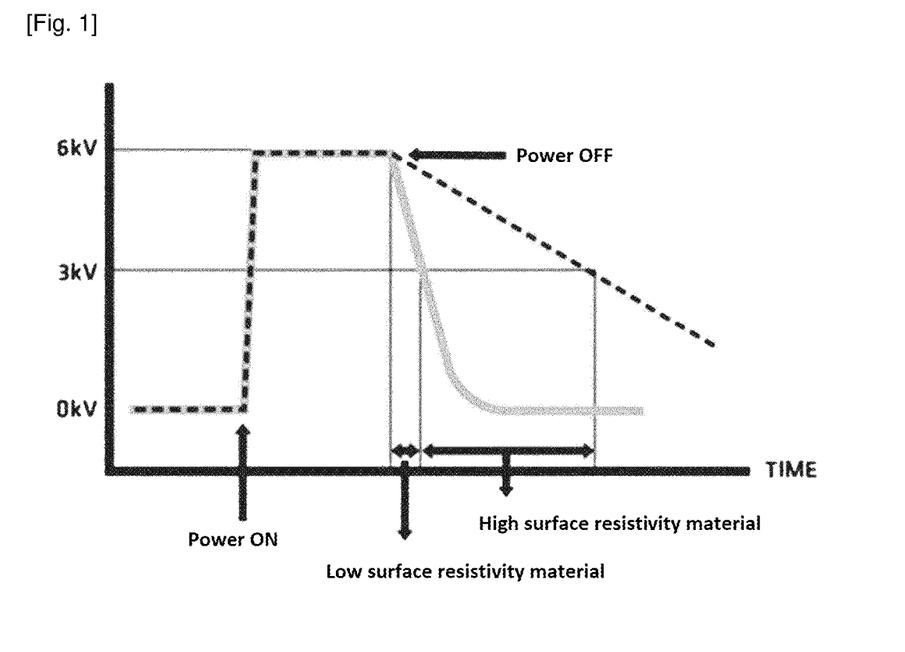
FIG. 1 is a graph for explaining the principle of measuring the discharge characteristics of the polyimide film.

FIG. 1 is a graph for explaining the principle of measuring the discharge characteristics of the polyimide film.

The saturation electrostatic voltage and half-life time for the polyimide film can be measured using a charge-discharge meter (also called an electrostatic attenuation meter, for example, HIDEST Meter H-0110 from SHIDHIDO ELECTROSTATIC, LTD.).

Specifically, after charging the film sample by irradiating ions generated by corona discharge, ion irradiation is stopped, and then an attenuation curve of the electric charge accumulated inside the sample is evaluated. When a distribution of charges is obtained in a normal state (saturation state) by applying charges from a high-voltage power supply to the sample, the application of the high-voltage power supply is stopped. Assuming the voltage in the saturation state is $V_0$, a decrease of the charge attenuated after t seconds according to the resistance characteristic of the sample itself is obtained from the graph of the attenuation curve of the charge over time. The potential V of the charge curve is calculated by the following equation.

$$V = V_0 \exp(-\tau/RL \cdot C), \tau = (RL \cdot C) \ln 2$$

(C: electrostatic capacity of the sample, RL: leakage resistance of the sample itself, τ: half-time)

The half-time (τ) is the time taken for the potential to decay to ½ of the initial potential when charges of the sample are diffused. Since the half-life is proportional to the leakage resistance RL, it is possible to estimate the charge transfer characteristics of the charged sample by calculating the half-time.

According to one embodiment, the DC voltage during charging by corona discharge may be 5 to 20 kV, for example, the DC voltage of 8 to 15 kV or 8 to 12 kV or about 10 kV are applied to generate corona discharge.

When the DC voltage by corona discharge is applied to the polyimide film, as shown in FIG. 1, the detected voltage value reaches a saturation value and has no more change at a specific voltage, and at this time the voltage is cut off. This saturation voltage is called "saturation electrostatic voltage".

The voltage loss at the saturation electrostatic voltage is measured by continuously detecting the potential attenuation state of the film after cutting off the voltage, for example, how much voltage is lost for 300 seconds at the saturation electrostatic voltage. The time taken for the potential to become ½ of the saturation voltage, that is, the time taken for the voltage loss to become 50% is defined as a "half-life".

Thus, the saturation electrostatic voltage and the half-life may be measured by a method comprising:

a) applying to a surface of the polyimide film a predetermined direct current voltage by corona discharge to accumulate static charges and detecting a voltage value due to the static charge;

b) measuring a voltage value when the detected voltage value reaches a saturation value and has no more change to obtain the saturation electrostatic voltage, and then stopping application of the corona discharge; and c) continuously detecting the potential value of the film when the application of corona discharge is stopped and measuring the time taken for the detected potential value for the saturation electrostatic voltage to become 50%, obtaining the half-life.

In general, when a fluorine group is introduced into a polyimide structure, it has an advantage of reduced $R_{th}$ with improved transparency by controlling packing density between molecules. However, as the fluorine content increases, the transparency and reduction effect of $R_{th}$ are good, but the residual stress is high, so bending of the substrate may occur after a high temperature process. Accordingly, it is essential to control the fluorine content in the polymer. On the other hand, the transparent substrate material having a low $R_{th}$ has a low modulus and a low yield strength, so that the yield strength appears before the tensile force reaches 100 MPa, which may cause deformation of the film during the process. In the case of such a film, cracks or tearing occurs due to lack of rigidity when the panel is repeatedly bent. Therefore, it may be difficult to manufacture a flexible substrate.

On the other hand, in general, in order to maintain the modulus above 3 GPa, the $R_{th}$ increases and the residual stress also increases. When the residual stress increases, the bending of the substrate may occur, resulting in defects in the TFT process.

According to one embodiment, the concentration of the fluorine atom contained in the polyimide may be calculated according to the following Equation 1.

Concentration of fluorine atom (wt %)=$\{\Sigma[(19\times$Mole number of fluorine atoms contained in acid dianhydride or diamine)/Molecular weight of acid dianhydride or diamine]$\times$[(Mass of acid dianhydride or diamine)/(Total mass of acid anhydride and diamine)]$\}\times 100$  [Equation 1]

The polyimide film according to one embodiment may be manufactured by using the diamine having a fluoro substituent.

In addition, the polyimide film according to an embodiment may be manufactured by using both of the acid dianhydride having a fluoro substituent and the acid dianhydride having no fluoro substituent. At this time, the molar ratio of the acid dianhydride having a fluoro substituent to the acid dianhydride having no fluoro substituent is 1:1 or more or 1:2 or more, or 1:2.5 or more, or 1:3 or more, and 1:4 or less or less than 1:4 or 1:3.5 or less.

When the molar ratio of the acid dianhydride having no fluoro substituent is too low, the thermal expansion coefficient (CTE) may increase, resulting in substrate bending, and when the ratio is too large, a yellowness (YI) may increase.

According to one embodiment, the polyimide film according to the present invention may comprise a polymerized and cured product of acid dianhydrides of the following formulas 1a and 1b and a diamine of the following formula 1c.

[Formula 1a]

[Formula 1b]

[Formula 1c]

In the formulas 1 b and 1c, $R_1$, $R_2$, $R_3$ and $R_4$ are each independently selected from the group consisting of a hydrogen atom, a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, $Q_1$ and $Q_2$ are each independently selected from a single bond, —O—, —CR'R"—, —C(=O)—, —C(=O)O—, —C(=O)NH—, —S—, —SO—, —SO$_2$—, —O[CH$_2$CH$_2$O]y-(y is an integer of 1 to 44), —NH(C=O) NH—, —NH(C=O)O—, a monocyclic or polycyclic cycloalkylene group having 6 to 18 carbon atoms, a monocyclic or polycyclic arylene group having 6 to 18 carbon atoms and a combination thereof, wherein R' and R" are each independently selected from the group consisting of a hydrogen atom, an alkyl group having 1 to 10 carbon atoms and a haloalkyl group having 1 to 10 carbon atoms, n1 and n2 are each independently an integer from 1 to 3, and n3 and n4 are each independently an integer from 1 to 4, and at least one of $R_1$, $R_2$, $R_3$, $R_4$, $Q_1$ and $Q_2$ necessarily contains a substituent containing a fluorine atom.

According to an embodiment, in the formula 1c, $Q_2$ is a single bond, and $R_3$ and $R_4$ may each independently be selected from —F, a fluoroalkyl group having 1 to 10 carbon atoms, and a fluoroalkoxy group having 1 to 4 carbon atoms, preferably a fluoroalkyl group having 1 to 10 carbon atoms.

According to one embodiment, the acid dianhydride of formula 1a may be present in 40 to 80 mol % of the total molar amount of the acid dianhydride. For example, the acid dianhydride of formula 1a may be present in 40 mol % or more, or 50 mol % or more, or 60 mol % or more, and may be less than 80 mol % or 79 mol % or less or 78 mol % or less or 75 mol % or less. When the content of the acid dianhydride of formula 1 is too low, the thermal expansion coefficient (CTE) may increase, resulting in bending of the substrate, and when it is too large, a yellowness (YI) may increase.

According to one embodiment, the polyimide film may comprise a polyimide having a repeating structure of the following formula 1.

[Formula 1]

In the formula 1,

$X_1$ and $X_2$, which may be the same or different, are each independently a tetravalent organic group derived from acid dianhydrides selected from the following structural formulas 1 to 3:

(1)

(2)

(3)

$Y_1$, $Y_2$ and $Y_3$, which may be the same or different, are each independently a divalent organic group derived from diamines selected from the following structural formulas 4 to 6:

(4)

(5)

(6)

in the formulas 4 to 6, $R_3$ and $R_4$ are each independently selected from a hydrogen atom, a halogen atom, a hydroxyl group (—OH), a thiol group (—SH), a nitro group (—$NO_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, n3 and n4 are each independently an integer from 1 to 4, n5 and n6 are each independently an integer from 1 to 3, and p, q and r are molar fractions.

Here, *represents a binding site.

According to one embodiment, p+q+r=1, p is 0.4 to 0.8, and q+r may be 0.2 to 0.6. For example, p may be 0.4 or more, 0.5 or more, or 0.6 or more, and less than 0.8, or 0.79 or less, or 0.78 or less, and q+r is 0.2 or more, 0.21 or more, or 0.22 or more and 0.6 or less, 0.5 or less, or 0.4 or less.

According to one embodiment, the polyimide film may have a residual stress after curing on an inorganic substrate of 10 to 25 MPa, or 10 to 22 MPa, preferably 20 MPa or less. The inorganic substrate may be a glass or silicon substrate.

According to one embodiment, the polyimide film may have a bowing or real bow value after curing on an inorganic substrate of 5 μm or more and 20 μm or less, or 15 μm or less. At this time, the "bowing" means "bending" of the film generated by the residual stress of the polyimide film.

According to one embodiment, the polyimide film according to the present invention may have a CTE (coefficient of thermal expansion) of 10 ppm/° C. or higher and 40 ppm/° C. or lower as measured after first heating and cooling in a range of 100 to 350° C., preferably 35 ppm/° C. or less, 33 ppm/° C. or less, 30 ppm/° C. or less, 25 ppm/° C. or less, or 22 ppm/° C. or less.

When the CTE is less than 10 ppm/° C., an anisotropic structure is formed due to strong packing density between polyimide molecules, and the absolute value of the retardation in a thickness direction ($R_{th}$) may be higher than 600 nm. When the CTE is greater than 40 ppm/° C., the retardation in a thickness direction may exhibit a value of 600 nm or less due to low packing density between polyimide molecules, but a residual stress to the substrate increases due to the high CTE, which may cause defects in the TFT process.

Figure 2:
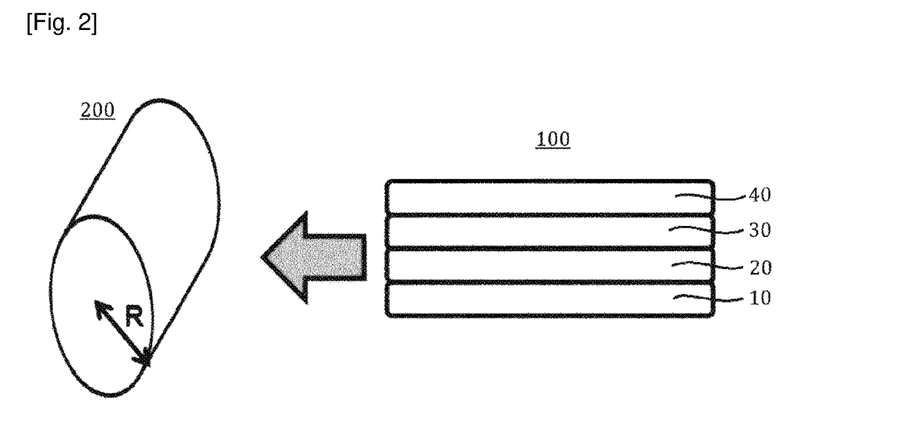
FIG. 2 schematically shows that a bending radius of a flexible display increases by a rolling process.

The present invention provides a laminate comprising the polyimide film as a flexible substrate. As shown in FIG. 2, the polyimide film 10 according to the present invention can be used as a substrate in the stacked structure 100 of a flexible display. For example, a TFT layer 20, an electroluminescent (EL) layer 30, and a back film 40 may be sequentially formed on the polyimide film 10.

According to one embodiment, the laminate may further include a +C-plate type compensation film, and the +C-plate type compensation film may have a retardation in a thickness direction ($R_{th}$) of 200 nm to 600 nm.

Since the polyimide film according to the present invention is a −C-plate type film having a retardation in a thickness direction of 200 to 600 nm, the display device can prevent external light from being reflected by internal electrodes of the display and being visible to naked eyes, by further providing a +C-plate type compensation film to compensate it.

The compound of formula 2 may be contained in 5 to 50% by weight relative to the total weight of the polymerization component, preferably 10 to 20% by weight relative to the total weight of the polymerization component.

When the polymerization component containing the structure of formula 2 is excessively added relative to the total weight of the polymerization component, mechanical properties such as modulus of the polyimide may be deteriorated and film strength may be reduced, resulting in physical damage such as tearing of the film in the process. In addition, when the diamine having the structure of formula 2 is excessively added, Tg derived from the polymer having the siloxane structure may appear, and as a result, Tg appears at a low process temperature of 350° C. or lower, and wrinkles may occur on the film surface due to the flow phenomenon of the polymer during the inorganic film deposition process of 350° C. or higher, resulting in cracks of the inorganic film.

In general, in the case of the polyimide containing 10% by weight or more of the diamine comprising the silicone oligomer structure of the formula 2 or the acid dianhydride in the polymerization component, the effect of reducing residual stress may be increased, and in the case of higher than 50% by weight, Tg is lower than 390° C., so that heat resistance can be lowered.

On the other hand, the polyimide according to the present invention can maintain Tg of 390° C. or higher, despite containing a silicone oligomer in an amount of 10% by weight or more based on the total polymerization component. Therefore, while maintaining the glass transition temperature at 390° C. or higher, the effect of reducing residual stress due to the silicone oligomer structure can also be achieved.

The molecular weight of the silicone oligomer structure having the structure of formula 2 contained in the diamine or acid dianhydride may be 4000 g/mol or more, wherein the molecular weight means a weight average molecular weight, and the molecular weight may be calculated by using NMR analysis or an acid-base titration method to calculate the equivalent of the reactive group such as amine or dianhydride.

When the molecular weight of the silicone oligomer structure comprising the structure of formula 2 is less than 4000 g/mol, heat resistance may be lowered, for example, the glass transition temperature (Tg) of the prepared polyimide may decrease, or the coefficient of thermal expansion may increase excessively.

According to the present invention, the silicon oligomer domain distributed in the polyimide matrix has a continuous phase, for example the size thereof is nano-sized, such as 1 nm to 50 nm, or 5 nm to 40 nm, or 10 nm to 30 nm, thereby minimizing residual stress while maintaining heat resistance and mechanical properties. If it does not have such a continuous phase, there may be a residual stress reduction effect, but it is difficult to use in the process due to a significant decrease in heat resistance and mechanical properties.

Here, the domain of the silicone oligomer means a region in which polymers having a silicone oligomer structure are distributed, and its size refers to a diameter of a circle surrounding the region. It is preferable that the parts (domains) containing the silicone oligomer structure are connected in a continuous phase in the polyimide matrix, wherein the continuous phase means a shape in which nano-sized domains are uniformly distributed.

Therefore, according to the present invention, despite having a high molecular weight, the silicone oligomer can be uniformly distributed in the polyimide matrix without phase separation, so that haze characteristics are lowered to obtain a polyimide having more transparent characteristics. In addition, the presence of the silicone oligomer structure in a continuous phase can improve mechanical strength and stress relaxation effect of the polyimide more efficiently. From these properties, the composition according to the present invention can provide a flat polyimide film having improved thermal and optical properties by reducing bending of the substrate after coating-curing. In the present invention, by inserting the silicone oligomer structure into the polyimide structure, the modulus of the polyimide can be appropriately improved, and the stress caused by external force can also be relieved. The polyimide containing the silicone oligomer structure may exhibit polarity, and phase separation may occur due to a polarity difference with the polyimide structure that does not include the siloxane structure, whereby the siloxane structure may be unevenly distributed throughout the polyimide structure. In this case, it is difficult to exhibit improvement effect of physical properties such as strength improvement and stress relaxation of the polyimide due to the siloxane structure, and haze increases due to phase separation, thereby deteriorating the transparency of the film. Particularly, when the diamine containing the siloxane structure has a high molecular weight, the polarity of the polyimide prepared therefrom may be more pronounced, so that the phase separation phenomenon between the polyimides may be more pronounced. At this time, when using a siloxane diamine having a low molecular weight structure, a large amount of siloxane diamine must be added in order to exhibit an effect such as stress relaxation. However, it may cause process problems such as a low $T_g$, and thus physical properties of the polyimide film may be deteriorated. Accordingly, in the case that the siloxane diamine having a high molecular weight is added, relaxation segments may be formed in the molecule largely, and thus a stress relaxation effect may be effectively exhibited even in a small amount, compared to the case of adding a low molecular weight of siloxane diamine. Therefore, the present invention can be more evenly distributed without phase separation in the polyimide matrix by using the compound of formula 2 having the siloxane structure having a high molecular weight.

As the polymerization component of the polyimide, one or more tetracarboxylic dianhydrides may be further included in addition to the tetracarboxylic dianhydride selected from the formulas 1 to 3. For example, as the tetracarboxylic dianhydride, it may be used a tetracarboxylic dianhydride containing aliphatic, alicyclic or aromatic tetravalent organic group(s), or a combination thereof in the molecule, wherein the aliphatic, alicyclic or aromatic tetravalent organic group(s) is connected to each other via a crosslinking structure. Preferably, it may include an acid dianhydride having a structure having a monocyclic or polycyclic aromatic, monocyclic or polycyclic alicyclic group, or two or more of these connected by a single bond or a functional group. Alternatively, it may include a tetracarboxylic dianhydride comprising a tetravalent organic group having aliphatic ring(s) or aromatic ring(s) in which each ring is a single ring structure, each ring is fused to form a heterocyclic structure, or each ring is connected by a single bond.

For example, it may include a tetracarboxylic dianhydride containing a tetravalent organic group selected from structures of the following formulas 3a to 3h.

[Formula 3a]

[Formula 3b]

[Formula 3c]

[Formula 3d]

[Formula 3e]

[Formula 3f]

[Formula 3g]

[Formula 3h]

In the formulas 3a to 3h,

$R_{11}$ to $R_{24}$ are each independently a substituent selected from a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, a1 is an integer of 0 to 2, a2 is an integer of 0 to 4, a3 is an integer of 0 to 8, a4 and a5 are each independently an integer of 0 to 3, a7 and a8 are each independently 0 to 3, a10 and a12 are each independently an integer of 0 to 3, a11 is an integer of 0 to 4, a15 and a16 are each independently an integer of 0 to 4, a17 and a18 are each independently an integer of 0 to 4, and a6, a9, a13, a14, a19 and a20 are each independently an integer of 0 to 3, n is an integer of 1 to 3, and

$A_{11}$ to $A_{16}$ are each independently selected from the group consisting of —O—, —CR'R"— (wherein, R' and R" are each independently selected from the group consisting of a hydrogen atom, an alkyl group having 1 to 10 carbon atoms (e.g., methyl group, ethyl group, propyl group, isopropyl group, n-butyl, tert-butyl group, pentyl group, etc.) and a haloalkyl group having 1 to 10 carbon atoms (e.g., trifluoromethyl group, etc.), —C(=O)—, —C(=O)O—, —C(=O)NH—, —S—, —SO$_2$—, —O[CH$_2$CH$_2$O]y-(y is an integer of 1 to 44), —NH(C=O)NH—, —NH(C=O)O—, a monocyclic or polycyclic cycloalkylene group having 6 to 18 carbon atoms (e.g., cyclohexylene group, etc.), a monocyclic or polycyclic arylene group having 6 to 18 carbon atoms (e.g., phenylene group, naphthalene group, fluorenylene group, etc.), and combinations thereof.

Alternatively, the tetracarboxylic dianhydride may comprise a tetravalent organic group selected from the group consisting of the following formulas 4a to 4n.

(4a)

(4b)

(4c)

(4d)

(4e)

(4f)

(4g)

(4h)

(4i)

(4j)

(4k)

(4l)

(4m)

(4n)

[Formula 5b]

[formula 5c]

[Formula 5d]

[Formula 5e]

At least one hydrogen atom in the tetravalent organic group of the formulas 4a to 4n may be substituted with a substituent selected from a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms. For example, the halogen atom may be fluoro (—F), the halogenoalkyl group is a fluoroalkyl group having 1 to 10 carbon atoms containing a fluoro atom, selected from a fluoromethyl group, a perfluoroethyl group, a trifluoromethyl group, etc. The alkyl group may be selected from a methyl group, an ethyl group, a propyl group, an isopropyl group, a t-butyl group, a pentyl group, and a hexyl group, and the aryl group is selected from a phenyl group and a naphthalenyl group. More preferably, it may be substituted with a fluorine atom or a substituent containing a fluorine atom such as a fluoroalkyl group.

Alternatively, the tetracarboxylic dianhydride may comprise a tetravalent organic group comprising aliphatic ring(s) or aromatic ring(s) in which each ring is a rigid structure, i.e., a single ring structure, each ring is connected by a single bond, or each ring is directly connected to form a heterocyclic structure.

According to one embodiment, as the polymerization component of the polyimide, one or more diamines may be further included in addition to the diamine selected from the formulas 4 to 6. For example, it may include a diamine comprising a divalent organic group selected from a monocyclic or polycyclic aromatic divalent organic group having 6 to 24 carbon atoms, a monocyclic or polycyclic alicyclic divalent organic group having 6 to 18 carbon atoms, or a divalent organic group having two or more of them connected by a single bond or a functional group. Alternatively, it may include a diamine comprising a divalent organic group having aliphatic ring(s) or aromatic ring(s) in which each ring is a single ring structure, each ring is fused to form a heterocyclic structure, or each ring is connected by a single bond.

For example, the diamine may comprise a divalent organic group selected from the following formulas 5a to 5e.

[Formula 5a]

In the formulas 5a to 5e, $R_{31}$ to $R_{37}$ are each independently selected from a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, $A_{21}$ and $A_{22}$ are each independently selected from the group consisting of —O—, —CR'R''— (wherein, R' and R'' are each independently selected from the group consisting of a hydrogen atom, an alkyl group having 1 to 10 carbon atoms (e.g., methyl group, ethyl group, propyl group, isopropyl group, n-butyl, tert-butyl group, pentyl group, etc.) and a haloalkyl group having 1 to 10 carbon atoms (e.g., trifluoromethyl group, etc.), —C(=O)—, —C(=O)O—, —C(=O)NH—, —S—, —SO$_2$—, —O[CH$_2$CH$_2$O]y-(y is an integer of 1 to 44), —NH(C=O)NH—, —NH(C=O)O—, a monocyclic or polycyclic cycloalkylene group having 6 to 18 carbon atoms (e.g., cyclohexylene group, etc.), a monocyclic or polycyclic arylene group having 6 to 18 carbon atoms (e.g., phenylene group, naphthalene group, fluorenylene group, etc.), and combinations thereof, b1 is an integer from 0 to 4, b2 is an integer from 0 to 6, b3 is an integer from 0 to 3, b4 and b5 are each independently an integer from 0 to 4, and b7 and b8 are each independently an integer from 0 to 9, and b6 and b9 are each independently an integer from 0 to 3.

For example, the diamine may comprise a divalent organic group selected from the following formulas 6a to 6p.

(6a)

(6b)

(6c)

Alternatively, the amine may comprise a divalent organic group in which an aromatic ring or an aliphatic structure form a rigid chain structure, for example, a divalent organic group having aliphatic ring(s) or aromatic ring(s) in which each ring is a single ring structure, each ring is connected by a single bond, or each ring is fused to form a heterocyclic structure.

According to one embodiment of the present invention, the total content of the tetracarboxylic dianhydride to the content of the diamine may be in a molar ratio of 1:1.1 to 1.1:1. In order to improve reactivity and processability, it is preferred that the total content of the tetracarboxylic dianhydride is excessive relative to the diamine, or the content of the diamine is excessive relative to the total content of the tetracarboxylic dianhydride.

According to one embodiment of the present invention, it is preferable that the molar ratio of the total content of the tetracarboxylic dianhydride to the content of the diamine is 1:0.98 to 0.98:1 or 1:0.99 to 0.99:1, preferably 1:0.98-0.99. The organic solvent that can be used in the polymerization reaction of polyamic acid may include ketones such as gamma-butyrolactone, 1,3-dimethyl-imidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylpropionamide (DMPA), diethylpropionamide (DEPA), dimethylacetamide (DMAc), N,N-diethylacetamide (DEAc), dimethylformamide (DMF), diethylformamide (DEF), N-methylpyrrolidone (NMP), N-ethylpyrrolidone (NEP), N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether, Equamide M100, Equamide B100 and the like, and these solvents may be used alone or as a mixture of two or more.

The reaction of tetracarboxylic dianhydride and diamine may be carried out by a conventional polymerization method of polyimide precursor, such as solution polymerization. Specifically, it can be prepared by dissolving diamine in an organic solvent, followed by adding tetracarboxylic dianhydride to the resulting mixed solution to polymerize.

The polymerization reaction may be carried out in an inert gas or a nitrogen stream and may be carried out under anhydrous condition.

The reaction temperature during the polymerization reaction may be −20 to 80° C., preferably 0 to 80° C. If the reaction temperature is too high, the reactivity may become high and the molecular weight may become large, and the viscosity of the precursor composition may increase, which may be unfavorable in the process.

It is preferable that the polyamic acid solution prepared according to the above-mentioned manufacturing method contains a solid content in an amount such that the composition has an appropriate viscosity in consideration of processability such as coating property in the film forming process.

The polyimide precursor composition containing polyamic acid may be in the form of a solution dissolved in an organic solvent. For example, when the polyimide precursor is synthesized in an organic solvent, the solution may be the reaction solution as obtained, or may be obtained by diluting this reaction solution with another solvent. When the polyimide precursor is obtained as a solid powder, it may be dissolved in an organic solvent to prepare a solution.

According to one embodiment, the solid content of the composition may be adjusted by adding an organic solvent in an amount such that the content of total polyimide precursor, i.e. polyamic acid is 20% by weight or less, preferably 15 to 20% by weight, more preferably 15 to 18% by weight.

The polyimide precursor composition may be adjusted to have a viscosity of 3,000 cP or more, and the polyimide precursor composition may be adjusted to have a viscosity of 10,000 cP or less, preferably 9,000 cP or less, more preferably 8,000 cP or less. The viscosity can be measured by a standard method of ASTM D4287, ISO2884. When the viscosity of the polyimide precursor composition is greater than 10,000 cP, the efficiency of defoaming during processing of the polyimide film is lowered. It results in not only the lowered efficiency of process but also the deteriorated surface roughness of the produced film due to bubble generation. It may lead to the deteriorated electrical, optical and mechanical properties.

The polyimide according to the present invention may have a weight average molecular weight of 10,000 to 200,000 g/mol, or 20,000 to 100,000 g/mol, or 30,000 to 100,000 g/mol. The molecular weight distribution (Mw/Mn) of the polyimide according to the present invention is preferably 1.1 to 2.5. The weight average molecular weight and the number average molecular weight are calculated by a gel permeation chromatography in terms of polystyrene standard.

When the weight average molecular weight or the molecular weight distribution of the polyimide is out of the above range, film formation may be difficult or the properties of polyimide film such as transmittance, heat resistance and mechanical properties may be deteriorated.

Then, the polyimide precursor resulted from the polymerization reaction may be imidized to prepare a transparent polyimide film.

According to one embodiment, the polyimide film may be manufactured by a method comprising the steps of:

applying the polyimide precursor composition onto a substrate; and thermal treating the applied polyimide precursor composition.

As the substrate, a glass substrate, a metal substrate, a plastic substrate, or the like can be used without any particular limitation. Among them, a glass substrate may be preferable which is excellent in thermal and chemical stabilities during the imidization and curing process for the polyimide precursor and can be easily separated even without any treatment with additional release agent while not damaging the polyimide film formed after curing.

The applying process may be carried out according to a conventional application method. Specifically, a spin coating method, a bar coating method, a roll coating method, an air knife method, a gravure method, a reverse roll method, a kiss roll method, a doctor blade method, a spray method, a dipping method, a brushing method, or the like may be used. Of these, it is more preferable to carry out by a casting method which allows a continuous process and enables to increase an imidization rate of polyimide.

In addition, the polyimide precursor composition may be applied on the substrate in the thickness range such that the polyimide film to be finally produced has a thickness suitable for a display substrate.

After the application of the polyimide precursor composition, a drying process for removing the solvent remained in the polyimide precursor composition may be further optionally performed prior to the curing process.

The drying process may be carried out according to a conventional method. Specifically, the drying process may be carried out at a temperature of 140° C. or lower, or from 80° C. to 140° C. If the drying temperature is lower than 80° C., the drying process becomes longer. If the drying temperature exceeds 140° C., the imidization proceeds rapidly, making it difficult to form a polyimide film having a uniform thickness.

Then, the polyimide precursor composition is applied on a substrate and heat-treated in an IR oven, in a hot air oven, or on a hot plate. The heat treatment temperature may range from 300 to 500° C., preferably from 320 to 480° C. The heat treatment may be performed in a multi-step heating process within the above temperature range. The heat treatment process may be performed for 20 to 70 minutes, and preferably for 20 to 60 minutes.

Thereafter, the polyimide film for a display substrate can be produced by peeling the polyimide film from the substrate according to a conventional method.

In addition, the present invention provides a process for manufacturing a flexible device, comprising the steps of:

preparing a polyimide precursor composition;

applying the polyimide precursor composition on a carrier substrate, and then heating to imidize the polyamic acid, thereby forming a polyimide film;

forming a device on the polyimide film; and peeling from the carrier substrate the polyimide film having the device formed thereon.

In particular, the process of manufacturing a flexible device may comprise a low temperature polysilicon (LTPS) thin film forming process, an ITO thin film forming process, or an oxide thin film forming process.

For example, a flexible device including an LTPS layer may be obtained by forming the LTPS layer by an LTPS thin film manufacturing process, followed by peeling a carrier substrate and a polyimide film by laser lift-off or the like, the LTPS thin film manufacturing process comprising:

forming a barrier layer comprising $SiO_2$ on the polyimide film;

depositing an a-Si (amorphous silicon) thin film on the barrier layer;

dehydrogen annealing by thermal treating the deposited a-Si thin film at a temperature of 400 to 500° C.; and crystallizing the a-Si thin film with an excimer laser or the like.

The oxide thin film process may be heat treated at a lower temperature than the process using silicon, for example, the heat treatment temperature of the ITO TFT process may be 190 to 290° C., and the heat treatment temperature of the oxide TFT process may be 300 to 400° C.

Hereinafter, embodiments of the present invention will be described in detail so that those skilled in the art can easily carry out the present invention. The present invention may, however, be embodied in many different forms and should not be construed as limited to the embodiments set forth herein.

<Comparative Example 1> BPAF: TFMB(1:0.99)

310 g of DEAc was charged into a reactor in a nitrogen stream, and then 0.07558 mol of 2,2'-bis(trifluoromethyl)benzidine (TFMB) was added while maintaining the reactor temperature at 25° C. to dissolve it. To the solution of TFMB, 0.07635 mol of 9,9'-bis(3,4-dicarboxyphenyl)fluorene dianhydride (BPAF) was added at the same temperature and stirred to obtain a transparent polyamic acid solution.

<Comparative Example 2> PMDA: BPDA: DDS(0.4:0.6:1)

200 g of DEAc was charged into a reactor in a nitrogen stream, and then 0.25215 mol of 4,4'-diaminodiphenylsulfone (DDS) was added while maintaining the reactor temperature at 25° C. to dissolve it. To the solution of DDS, 0.1008 mol of pyromellitic dianhydride (PMDA) and 0.15129 mol of biphenyl-tetracarboxylic acid dianhydride (BPDA) were added at the same temperature and stirred to obtain a transparent polyamic acid solution.

<Comparative Example 3> 6FDA: TFMB(1:0.99)

290 g of DEAc was charged into a reactor in a nitrogen stream, and then 0.078 mol of 2,2'-bis(trifluoromethyl)benzidine (TFMB) was added while maintaining the reactor temperature at 25° C. to dissolve it. To the solution of TFMB, 0.079 mol of 4,4'-(hexafluoroisopropylidene)diphthalic anhydride (6FDA) was added at the same temperature and stirred to obtain a transparent polyamic acid solution.

<Example 1> BPAF: PMDA: TFMB(0.25:0.75:0.99)

654 g of DEAc was charged into a reactor in a nitrogen stream, and then 0.1936 mol of 2,2'-bis(trifluoromethyl)benzidine (TFMB) was added while maintaining the reactor temperature at 25° C. to dissolve it. To the solution of TFMB, 0.1467 mol of pyromellitic dianhydride (PMDA) and 0.049 mol of 9,9'-bis(3,4-dicaroxyphenyl)fluorene dianhydride (BPAF) were added at the same temperature and stirred to obtain a transparent polyamic acid solution.

<Example 2> 6FDA: PMDA: TFMB(0.23:0.77:0.99)

200 g of DEAc was charged into a reactor in a nitrogen stream, and then 0.0707 mol of 2,2'-bis(trifluoromethyl)benzidine (TFMB) was added while maintaining the reactor temperature at 25° C. to dissolve it. To the solution of TFMB, 0.055 mol of pyromellitic dianhydride (PMDA) and 0.016 mol of 4,4'-(hexafluoroisopropylidene)diphthalic anhydride (6FDA) were added at the same temperature and stirred to obtain a transparent polyamic acid solution.

<Example 3> 6FDA: PMDA: TFMB(0.27:0.73:0.99)

246 g of DEAc was charged into a reactor in a nitrogen stream, and then 0.07220 mol of 2,2'-bis(trifluoromethyl)benzidine (TFMB) was added while maintaining the reactor temperature at 25° C. to dissolve it. To the solution of TFMB, 0.053 mol of pyromellitic dianhydride (PMDA) and 0.020 mol of 4,4'-(hexafluoroisopropylidene)diphthalic anhydride (6FDA) were added at the same temperature and stirred to obtain a transparent polyamic acid solution.

<Example 4> 6FDA: PMDA: TFMB(0.3:0.7:0.99)

200 g of DEAc was charged into a reactor in a nitrogen stream, and then 0.07279 mol of 2,2'-bis(trifluoromethyl)benzidine (TFMB) was added while maintaining the reactor temperature at 25° C. to dissolve it. To the solution of TFMB, 0.051 mol of pyromellitic dianhydride (PMDA) and 0.022 mol of 4,4'-(hexafluoroisopropylidene)diphthalic anhydride (6FDA) were added at the same temperature and stirred to obtain a transparent polyamic acid solution.

<Reference Example 1> 6FDA: PMDA: TFMB(0.2:0.8:0.99)

200 g of DEAc was charged into a reactor in a nitrogen stream, and then 0.07319 mol of 2,2'-bis(trifluoromethyl)benzidine (TFMB) was added while maintaining the reactor temperature at 25° C. to dissolve it. To the solution of TFMB, 0.05914 mol of pyromellitic dianhydride (PMDA) and 0.01479 mol of 4,4'-(hexafluoroisopropylidene)diphthalic anhydride (6FDA) were added at the same temperature and stirred to obtain a transparent polyamic acid solution.

<Reference Example 2> 6FDA: PMDA: TFMB(0.7:0.3:0.99)

200 g of DEAc was charged into a reactor in a nitrogen stream, and then 0.06052 mol of 2,2'-bis(trifluoromethyl)benzidine (TFMB) was added while maintaining the reactor temperature at 25° C. to dissolve it. To the solution of TFMB, 0.01834 mol of pyromellitic dianhydride (PMDA) and 0.04279 mol of 4,4'-(hexafluoroisopropylidene)diphthalic anhydride (6FDA) were added at the same temperature and stirred to obtain a transparent polyamic acid solution.

Experimental Example 1

Each of the polyimide precursor solutions prepared in Examples 1 to 4 and Comparative Examples 1 to 3 was spin coated on a glass substrate of 370×470 mm. The glass substrate coated with the polyimide precursor solution was placed in an oven, heated at a rate of 5° C./min and cured at 80° C. for 30 minutes and at 400° C. for 30 minutes to prepare a polyimide film.

Properties of each film were measured and shown in Table 1 below.

<Fluorine Concentration (Wt %)>

The fluorine concentration of the polyimide of Examples 1 to 4 and Comparative Examples 1 to 3 was calculated using the following Equation 1.

Concentration of fluorine atom (wt %)={Σ[(19×Mole number of fluorine atoms contained in acid dianhydride or diamine)/Molecular weight of acid dianhydride or diamine]×[(Mass of acid dianhydride or diamine)/(Total mass of acid anhydride and diamine)]}×100     [Equation 1]

Referring to Comparative Example 3 as an example, the method for calculating the concentration of fluorine atom is as follows.

Consumption of component (monomer) (wt): 6FDA 35 g (0.079 mol), TFMB 24.9782 g (0.078 mol)
Content (wt) of each component in the polymer
6FDA: 35/(35+24.9782)=0.584
TFMB: 24.9782/(35+24.9782)=0.416
Content (wt) of fluorine contained in each component
TFMB (fluorine 6eq×atomic weight of fluorine 19=114 g)/molecular weight of TFMB 320.24 g
114/320.24=0.35598
6FDA (fluorine 6eq×atomic weight of fluorine 19=114 g)/molecular weight of 6FDA 444.24 g
114/444.24=0.2566
Fluorine concentration for each component (wt %) and total fluorine concentration in the polymer (wt %)
TFMB: (0.416×0.35598)×100=14.825 wt %
6FDA: (0.584×0.2566)×100=14.974 wt %
Total fluorine concentration: 29.79 wt %

<Yellowness (YI)>

Yellowness index (YI) was measured with Color Eye 7000A.

<Haze>

Haze was measured by the method according to ASTM D1003 using a Haze Meter HM-150.

<Transmittance>

Transmittance was measured for a wavelength of 450 nm, 550 nm, and 650 nm with a transmittance meter (Model name HR-100, manufactured by Murakami Color Research Laboratory) based on JIS K 7105.

<Retardation in a Thickness Direction ($R_{th}$)>

Retardation in a thickness direction ($R_{th}$) was measured with Axoscan. The film was cut to a certain size and the thickness was measured. Then, a retardation value was measured with Axoscan. To compensate the retardation value, the thickness (nm) measured while being corrected in the C-plate direction was input to Axoscan.

<Glass Transition Temperature (Tg) and Thermal Expansion Coefficient (CTE)>

The film was cut to 5×20 mm to prepare a sample, and then the sample was loaded using an accessory. A length of the film to be actually measured was equal to 16 mm. A pulling force was set at 0.02 N. The first temperature-rising step was carried out at a heating rate of 5° C./min from 100 to 350° C., then cooling was carried out at a cooling rate of 4° C./min from 350 to 100° C. The change in the thermal expansion was measured with TMA (Q400, TA Company). At this time, the inflection point appeared in the temperature-rising section during the second temperature-rising step was defined as Tg.

<Thermal Decomposition Temperature (Td1%)>

The temperature at which the weight loss of the polymer was 1% was measured using TGA in a nitrogen atmosphere.

<Modulus (GPa), Tensile Strength (MPa), Elongation (%) and Strain (%)>

A film of 5 mm×50 mm long and 6 to 8 μm thick was stretched at a speed of 10 mm/min with a tensile tester (Instron 3342, manufactured by Instron) to measure modulus (GPa), tensile strength (MPa) and elongation (%). Based on the obtained results, strain when the tensile strength was 100 MPa was measured using UTM from Zwick.

<Measurement of Residual Stress and Bow Value>

The resin composition was applied on a 6 inch of silicon wafer having a thickness of 525 μm by a spin coater, wherein [amount of bowing] of the wafer has been previously measured by using a residual stress meter (FLX2320 of TENCOR), and was cured in an oven (manufactured by Koyo Lindberg) at 250° C. for 30 min and at 400° C. for 60 min in a nitrogen atmosphere. A silicon wafer with the resin film having a thickness of 6 to 8 μm after curing was produced. The amount of bowing of the wafer with the resin film attached is expressed as a Real Bow value measured by the above-mentioned residual stress meter, and the residual stress generated between the silicon wafer and the resin film was measured.

TABLE 1

| Sample | Comp. Ex 1 | Ex. 1 | Ex. 2 | Ex. 3 | Ex. 4 | Comp. Ex. 2 | Comp. Ex 3 | Ref. Ex 1 | Ref. Ex. 2 |
|---|---|---|---|---|---|---|---|---|---|
| F Con. (wt %) | 14.55 | 18.96 | 23.69 | 24.09 | 24.38 | 0 | 29.79 | 23.37 | 29.80 |
| Sol. Con. (wt %) | 15.6 | 10.2 | 10.2 | 10.4 | 10.4 | 17.3 | 16.5 | 9.96 | 13.2 |
| Viscosity (cps) | 3100 | 7058 | 3957 | 3066 | 2530 | 5300 | 3500 | 3920 | 3900 |
| Thickness (μm) | 6.8 | 7.3 | 6.09 | 6.39 | 6.70 | 7.1 | 7.3 | 7.25 | 7.39 |
| YI | 2.1 | 6.80 | 5.8 | 5.7 | 5.5 | 5.5 | 2.5 | 7.9 | 3.8 |
| Rth(nm) | −50 | −360 | −559 | −518 | −459 | −86 | −100 | −630 | −220 |
| Transmission 450 nm | 88.3 | 83.1 | 84.4 | 84.9 | 84.8 | 82.5 | 87.9 | — | — |
| (%) 550 nm | 89.9 | 88.2 | 88.3 | 88.6 | 88.4 | 88.9 | 89.7 | — | — |
| 650 nm | 90.9 | 88.9 | 89.8 | 90.3 | 88.8 | 89.2 | 90.6 | — | — |
| CTE 1$^{st}$ heating (100-350° C.) | 50 | 5.33 | 6.54 | 8.54 | 7.82 | 38.2 | 140.3 | 3.82 | 46.9 |
| 1$^{st}$ cooling | 65 | 20.6 | 11.2 | 17.4 | 20.9 | 59.3 | 100.7 | 8.6 | 68.5 |
| Tg (° C.) | 390 | 430 | 415 | 410 | 406 | 403 | 363 | >450 | 380 |
| Young modulus (GPa) | 4.1 | 6.4 | 6.7 | 6.2 | 5.8 | 2.8 | 3.5 | 7.2 | 3.9 |
| Tensile strength (MPa) | 115 | 201 | 262 | 250 | 223 | 107 | 121 | 293 | 167 |
| Strain (%) 100 MPa | 6.3 | 1.65 | 1.75 | 1.92 | 2.03 | >33 | 4.5 | 1.54 | 3.8 |
| Real Bow (μm) | 32.5 | 19.3 | 8.21 | 10.5 | 13.1 | 32.5 | 37.6 | 17.9 | 36.6 |
| Residual stress (MPa) | 40.2 | 20.6 | 12.2 | 16.1 | 19.9 | 41.2 | 44.0 | 18.8 | 42.9 |

As shown in Table 1, the polyimide film of Comparative Example 1 having a fluorine atom concentration of 14.55 wt % has low tensile strength, high strain and high residual stress and real bow, so that the bending of the substrate may occur during the TFT process, and the chemical resistance is poor, so that the film may be dissolved by a developer during the TFT process. In addition, both of the polyimide film of Comparative Example 2 having no fluorine atom and the polyimide film of Comparative Example 3 having a fluorine atom concentration exceeding 28 wt % have low tensile strength, high strain, and high residual stress and real bow, so that the bending of the substrate may occur during the TFT process.

On the other hand, in Examples 1 to 4, where the fluorine atom concentration satisfies the range of 18 to 28 wt %, the modulus has a value of 5 GPa or more, which indicates excellent stiffness, and the residual stress has a value of 10 to 25 MPa, so that the occurrence of bending of the substrate during the TFT process can be reduced. In addition, by a high transparency and absolute value of $R_{th}$ in the range of 200 to 600 nm, it is possible to provide a substrate material having excellent visual sensibility of reflection when using a viewing angle compensation film (+C-plate 200 nm to 600 nm) together. From this, it is found that the concentration of the fluorine atom should not be too low, but also if the concentration of the fluorine atom is too high, it is not suitable for using as a display substrate material.

On the other hand, according to Reference Examples 1 and 2, when the molar ratio of the acid dianhydride (e.g., PMDA) having no fluoro substituent relative to the acid dianhydride (e.g., 6FDA) having a fluoro substituent is too low, the coefficient of thermal expansion (CTE) increases, so that bending of the substrate may occur, and when the ratio is too large, the yellowness (YI) increases.

Experimental Example 2

The saturation electrostatic voltage and the voltage loss of the polyimide film of Examples 1 to 3 and Comparative Example 2 were measured and the results are shown in Table 2.

The saturation electrostatic voltage and the half-life were measured using H-0110 Honestmeter manufactured by SHISHIDO ELECTROSTATIC at a temperature at 25° C. and a humidity of 40 to 50% according to the JIS L 1094 standard measurement method.

For each of the prepared polyimide films, the applied voltage was set to 10 kV, and the distance from the tip of the needle electrode of the applying portion to the surface of the rotating disk was adjusted to 20 mm, and the distance from the electrode plate of the receiving portion to the surface of the rotating disk was adjusted to 15 mm. The application was started with applied voltage of 10 kV while rotating the rotating disk, and after 100 seconds the application was cut off. The time taken for the electrostatic voltage to attenuate to ½ was measured while rotating the rotating disk. The half-life was obtained by measuring the time taken for the value of the potential to decrease to 50% of the saturation electrostatic voltage value from cutting off the application.

TABLE 2

|  | Comparative Example 1 | | Comparative Example 2 | | Example 1 | | Example 2 | | Example 3 | | Example 4 | |
| --- | --- | --- | --- | --- | --- | --- | --- | --- | --- | --- | --- | --- |
| Fluorine atom concentration % | 23.4 | | 0 | | 23.75 | | 24.15 | | 24.4 | | 19.57 | |
| Thickness (μm) | 6.02 | | 6.3 | | 6.1 | | 6.2 | | 6.30 | | 6.2 | |
| Saturation electrostatic voltage (kW) | 1.23 | time sec | 1.04 | time sec | 1.25 | time sec | 1.27 | time sec | 1.24 | time sec | 1.23 | time sec |
| 99% | 1.22 | 0.00 | 1.03 | 0.00 | 1.24 | 0.01 | 1.25 | 0.01 | 1.23 | 0.01 | 1.22 | 0.00 |
| 95% | 1.17 | 2.91 | 0.98 | 0.88 | 1.18 | 2.56 | 1.21 | 2.98 | 1.18 | 3.12 | 1.16 | 3.05 |
| 90% | 1.11 | 7.91 | 0.93 | 2.71 | 1.12 | 7.23 | 1.01 | 8.13 | 1.11 | 8.51 | 1.10 | 6.59 |
| 80% | 1.98 | 23.17 | 0.83 | 8.16 | 1.00 | 22.9 | 0.89 | 26.5 | 0.99 | 27.6 | 0.98 | 21.6 |
| 70% | 0.86 | 50.05 | 0.72 | 17.38 | 0.87 | 56.8 | 0.76 | 63.8 | 0.87 | 68.5 | 0.86 | 53.2 |
| 60% | 0.74 | 167.2 | 0.62 | 33.9 | 0.75 | 178.7 | 0.63 | 189.3 | 0.74 | 1873 | 0.73 | 145.6 |
| 50% | 0.61 | 281.04 | 0.52 | 63.78 | 0.62 | 283.52 | 0.61 | 286.6 | 0.62 | 289.22 | 0.61 | 275.1 |

For reference, Table 3 shows the characteristics of saturation electrostatic voltage of glass. In the case of glass, the electrostatic voltage does not drop at 90%.

TABLE 3

| Glass (Thickness 0.5T) | | |
| --- | --- | --- |
| | Electrostatic voltage (kV) | Time (sec) |
| Saturation electrostatic voltage (100%) | 2.28 | 0 |
| 99% | 2.25 | 1.77 |
| 95% | 2.16 | — |
| 90% | 2.05 | 157.74 |
| 90% | 2.05 | 300 |

According to the above results, it is found that the time for reaching the half-life voltage of the polyimide according to the present invention is 250 seconds or more. From this, it can be seen that the current drop phenomenon generated when driving TFT of the polyimide film according to the present invention can be alleviated.

<Experimental Example 3> Rolling Test

As shown in FIG. 2, according to Examples and Comparative Examples a polyimide (PI) film 10 was formed on a glass substrate (not shown), a TFT layer 20 was formed thereon, an EL (electroluminescent) layer 30 was formed thereon, and then a back film 40 was attached thereto to prepare a laminate 100. The laminate 100 was detached from the glass substrate by laser release to obtain a display panel. After cutting the panel to have a width of 10 mm using a laser, using a MIT-D equipment from TOYOSEKI, a folding test was performed 1000 times with a jig for each radius of curvature (R) under the folding condition of an angle of 135°, a load of 250 g and at a rate of 175 times/min. FIG. 2 shows the radius of curvature (R) when the laminate is bent. The results are summarized in Table 4. In Table 4, 10R, 30R, 50R, and 100R mean the degree of curvature of a circle with a radius of 10 mm, 30 mm, 50 mm, or 100 mm, respectively.

◎: No crack and tearing occur in 1000 times
x: Cracks or tearing occurs in 1000 times

TABLE 4

| Sample | Comp. Ex. 1 | Ex. 1 | Ex. 2 | Ex. 3 | Ex. 4 | Comp. Ex. 2 | Comp. Ex. 3 |
|---|---|---|---|---|---|---|---|
| Rolling test 10R | ◎ | ◎ | ◎ | ◎ | ◎ | X | ◎ |
| Rolling test 30R | ◎ | ◎ | ◎ | ◎ | ◎ | X | ◎ |
| Rolling test 50R | ◎ | ◎ | ◎ | ◎ | ◎ | X | ◎ |
| Rolling test 100R | ◎ | ◎ | ◎ | ◎ | ◎ | X | ◎ |
| Strain Tensile 100 MPa | 6.3 | 1.65 | 1.75 | 1.92 | 2.03 | >33 | 4.5 |

As can be seen from the rolling test results of Table 4, the polyimide films of Examples 1 to 4 exhibit the modulus of 5 GPa or more and the strain of 10% or less at a tensile force of 100 MPa, preferably 5% or less. Therefore no crack or tearing occurred even after rolling test. In contrast, in the case of Comparative Example 2, since the modulus is 3 GPa or less and the strain exceeds 30% at a tensile force of 100 MPa, that is, the yield strength does not exceed 100 MPa, plastic deformation of the film occurs and cracks and tearing occur due to stress and tension in the rolling test.

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A polyimide film comprising a polymerized and cured product of an acid dianhydride and a diamine, wherein at least one of the acid dianhydride and the diamine has a fluorine-containing substituent, wherein the film has a thickness of 5 to 10 μm, a modulus of 3 to 8 GPa, an absolute value of a retardation in a thickness direction ($R_{th}$) of 200 to 600 nm, and a strain of 10% or less at a tensile force of 100 MPA,
wherein the polyimide film has a saturation electrostatic voltage of at least 1.23 kV and a half-life of the saturation electrostatic voltage of at least 250 seconds, and
wherein the saturation electrostatic voltage and the half-life are measured by a method comprising a) applying to a surface of the polyimide film a predetermined direct current voltage by corona discharge to accumulate static charges and detecting a voltage value due to the static charge; b) measuring a voltage value when the detected voltage value reaches a saturation value and has no more change to obtain the saturation electrostatic voltage, and then stopping application of the corona discharge; and c) continuously detecting a potential value of the film when the application of corona discharge is stopped and measuring the time taken for the detected potential value for the saturation electrostatic voltage to become 50%, obtaining the half-life.

2. The polyimide film according to claim 1, wherein a concentration of the fluorine atom contained in the polyimide is 18 to 28 wt % as calculated according to the following Equation 1:

Concentration of fluorine atom (wt %)={Σ[(19×Mole number of fluorine atoms contained in acid dianhydride or diamine)/Molecular weight of acid dianhydride or diamine)]×[(Mass of acid dianhydride or diamine)/(Total mass of acid anhydride and diamine)]}×100    Equation 1.

3. The polyimide film according to claim 1, wherein the diamine has a fluoro substituent.

4. The polyimide film according to claim 1, wherein the acid dianhydride comprises an acid dianhydride having a fluoro substituent and an acid dianhydride having no fluoro substituent.

5. The polyimide film according to claim 4, wherein a molar ratio of the acid dianhydride having a fluoro substituent to the acid dianhydride having no fluoro substituent is 1:1 to 1:4.

6. The polyimide film according to claim 1, wherein the polyimide film comprises a polymerized and cured product of acid dianhydrides of the following formulas 1a and 1b and a diamine of the following formula 1c,

[Formula 1a]

[Formula 1b]

[Formula 1c]

in the formulae 1b and 1c, $R_1$, $R_2$, $R_3$ and $R_4$ are each independently selected from the consisting of a hydrogen atom, a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, $Q_1$ and $Q_2$ are each independently selected from a single bond, —O—, —CR'R"—, —C(=O)—, —C(=O)O—, —C(=O)NH—, —S—, —SO—, —SO$_2$—, —O[CH$_2$CH$_2$O]y-(y is an integer of 1 to 44), —NH(C=O)NH—, —NH(C=O)O—, a monocyclic or polycyclic cycloalkylene group having 6 to 18 carbon atoms, a monocyclic or polycyclic arylene group having 6 to 18 carbon atoms and a combination thereof, wherein R' and R" are each independently selected from the group consisting of a hydrogen atom, an alkyl group having 1 to 10 carbon atoms and a haloalkyl group having 1 to 10 carbon atoms, n1 and n2 are each independently an integer from 1 to 3, and n3 and n4 are each independently an integer from 1 to 4, and at least one of $R_1$, $R_2$, $R_3$, $R_4$, $Q_1$ and $Q_2$ contains a substituent containing a fluorine atom.

7. The polyimide film according to claim 6, wherein $Q_2$ is a single bond, and $R_3$ and $R_4$ are each independently —F, a fluoroalkyl group having 1 to 10 carbon atoms, or a fluoroalkoxy group having 1 to 4 carbon atoms.

8. The polyimide film according to claim 6, wherein $Q_1$ is —CR'R"—, and R' and R" are each independently a hydrogen atom, an alkyl group having 1 to 10 carbon atoms, or a haloalkyl group having 1 to 10 carbon atoms.

9. The polyimide film according to claim 6, wherein the acid dianhydride of the formula 1a is present in 40 to 80 mol % of the total molar amount of the acid dianhydride.

10. The polyimide film according to claim 6, wherein the acid dianhydride of the formula 1a is present in 50 to 79 mol % of the total molar amount of the acid dianhydride.

11. The polyimide film according to claim 1, wherein the polyimide film comprises a polyimide having a repeating structure of the following formula 1:

[Formula 1]

in the formula 1,

$X_1$ and $X_2$, which are the same or different, are each independently a tetravalent organic group derived from an acid dianhydride selected from the following structural formulae 1 to 3, (1)

(2)

(3)

$Y_1$, $Y_2$ and $Y_3$, which are the same or different, are each independently a divalent organic group derived from a diamine selected from the following structural formulae 4 to 6, (4)

(5)

(6)

in the structural formulae 4 to 6, $R_3$ and $R_4$ are each independently selected from a hydrogen atom, a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, n3 and n4 are each independently an integer from 1 to 4, n5 and n6 are each independently an integer from 1 to 3, and p, q and r are molar fractions.

12. The polyimide film according to claim 11, wherein p+q+r=1, p is 0.4 to 0.8, and q+r is 0.2 to 0.6.

13. The polyimide film according to claim 1, wherein the polyimide film has a residual stress after cured on an inorganic substrate of 10 to 25 MPa.

14. The polyimide film according to claim 1, wherein the polyimide film has a bowing value after cured on an inorganic substrate of 5 μm or more and 20 μm or less.

15. A laminate comprising the polyimide film according to claim 1 as a flexible substrate.

16. The laminate according to claim 15, wherein the laminate further comprises a +C-plate type compensation film.

17. The laminate according to claim 16, wherein a retardation in a thickness direction ($R_{th}$) of the +C-plate type compensation film is 200 nm or more and 600 nm or less.

18. A flexible display comprising the polyimide film according to claim 1 as a display substrate.

19. A flexible display comprising the laminate according to claim 15.

* * * * *